June 23, 1953      J. K. WOOD      2,643,109

SPRING DEVICE

Filed May 28, 1945      2 Sheets-Sheet 1

INVENTOR.
Joseph Kaye Wood
BY
Blair, Curtis + Hayward
ATTORNEYS

June 23, 1953  J. K. WOOD  2,643,109
SPRING DEVICE

Filed May 28, 1945  2 Sheets-Sheet 2

INVENTOR.
Joseph Kaye Wood
BY
Blair, Curtis + Hayward
ATTORNEYS

Patented June 23, 1953

2,643,109

UNITED STATES PATENT OFFICE 2,643,109

SPRING DEVICE

Joseph Kaye Wood, New York, N. Y., assignor to General Spring Corporation, New York, N. Y., a corporation of New York Application May 28, 1945, Serial No. 596,298

3 Claims. (Cl. 267—1)

This invention relates to coil springs having non-uniform load-deflection characteristics within the operating range of elastic deflection of the springs. More particularly the invention relates to a continuous wire coil spring which has such non-uniform load-deflection characteristics, preferably well within the operating range of elastic deflection of the spring, that it may be used in hangers or other supports for piping, machinery, or any other device that is subject to vibration, to prevent the building up of harmonic oscillations in the hangers or supports.

The load-deflection graph of a wire coil spring, either a compression spring or a tension spring, will usually appear as a sloping substantially straight line so long as the turns or individual coils of the spring remain free to move relatively to each other. Such a spring, having a straight line characteristic, is harmonic and will vibrate in resonance at some definite frequency.

I have previously demonstrated that a spring which is wound with a progressively varying pitch (or backwind in the case of a tension spring) will be non-harmonic in the range of its deflection in which a part of the coil is going out of, or coming into, action. Such a spring, however, unless the change of its effective length is very rapid (i. e. unless the pitch varies radically from coil to coil), does not exert a substantial damping action on an otherwise harmonic system in which it is used. If the variation is so rapid as to be effective to damp vibrations, then the pitch must increase exorbitantly after a few turns, and the extension or compression practicably attainable is unduly limited.

I have now discovered that if a spring is made with a plurality of sections each composed of turns of the same pitch, but the pitch in the different sections being respectively quite different, there will be such an abrupt change in the characteristic of the spring at the point where the turns of one section close together that the spring will actually have a significant damping effect on an otherwise resonant system if this point occurs at or close to the center of the vibrating range.

Thus, in the case of a compression spring, if some of the turns are brought by the deflection into contact with each other, so that they no longer operate as a compressible part of the spring, while other turns remain separated and thus compressible, or if, in the case of a tension spring, some of the turns are initially held in contact by internal stress, such as is produced by backwind, so that a certain amount of initial spring deflecting tension must be applied to the spring as a whole before they begin to separate, the load-deflection characteristics of such a spring will change at the deflection point where the turns contact in the compression spring or separate in the tension spring and the graph of such a spring will therefore show and abrupt change of direction at the point thereon where the change in the effective length of the spring, that is, the part of the spring subject to deflection, has taken place.

Since the deflection of a coil spring results in a change in its length, it will be apparent that the effective length of a coil spring which is subject to deflection by the load will be the length only of that part in which a relative movement of the turns or coils can be brought about by a change in load. When, therefore, a coil spring is so constructed that, within the range of its elastic deflection, a group of coils that has been operative goes out of operation, or one that has not been operative comes into operation, the effective length of the spring changes with this event and there is therefore a change in the load-deflection characteristics of the spring, or, as shown by its load-deflection graph, there is usually an abrupt change in the inclination thereof at this load-deflection point.

When a coil spring is used as an element of a variable support spring hanger or other supporting means for piping, machinery, or any other device that is subject to vibration, it is usually advantageous so to construct the hanger or other support that there is no danger of the building up of harmonic oscillations in the hanger or support. If an elastic variable support hanger is used which has a load-deflection characteristic not subject to any rapid change with changing position of the load, resonance may be established with the result of amplifying an impressed vibration. Such supports are therefore unsuitable for the suspension or other support of a pipe line or other machine or device subject to vibration.

Various means and methods have been devised for overcoming this tendency to resonance. See, for example, my U. S. Letters Patent No. 2,335,834, granted November 30, 1943.

One of the objects of the present invention is to make possible obtaining, in a variable support hanger or other supporting means, such oscillation damping with a single spring. As will be seen hereinafter such a result is obtained according to this invention by providing a spring, having the non-uniform load-deflection characteristics as above described, e. g. in a support or hanger for piping, machinery, or any other device which is subject to vibration, so that the range of the deflections of the spring, when vibrations are impressed thereupon, will extend to the two sides of the point of deflection in the spring where the turns are brought into contact in the compression spring or are caused to separate in the tension spring after the internal stress of the backwind has been overcome. If this be done, the spring will have two different characteristics, one effective upon one side of the mean point of vibration and the other effective upon the other side of said mean point, and each having a different period of vibration, so that each kills during the half-cycle of its effectiveness any tendency caused during the other half-cycle to build up harmonic oscillations in the hanger or support.

It will be understood that the characteristics hereinabove set forth are of substantially equal utility both in compression springs and in tension springs so far as insuring that the springs shall have the desired non-uniform load-deflection and non-harmonic characteristics is concerned.

Although reference has been made hereinabove to compression springs and tension springs as though they were separate entities, it will be apparent, from a study of the following description, that a continuous wire coil spring can be so constructed that it may be used both as a tension spring and as a compression spring and that, when used in either capacity, it will have the non-uniform load-deflection and non-harmonic characteristics of the present invention. Not only does the invention contemplate combining in one unit a compression and tension spring having all of the important novel characteristics of the present invention, but it further contemplates so opposing to each other a tension spring and a compression spring, at least one of which has the novel characteristics of the present invention, that its non-uniformity of the load-deflection characteristics are imparted to the combined unit. This has particular utility in providing compact pipe hangers or other supports for piping, machinery or other structures subject to vibration where an accurately predetermined load can be flexibly supported by a spring but should be protected against harmonic oscillations.

Other important features and objects of the invention, to which specific reference has not been made hereinabove, will appear hereinafter when the following description and claims are considered in connection with the accompanying drawings, in which—

Figure 1:
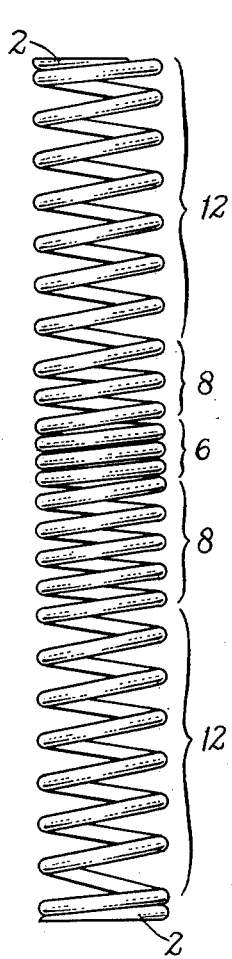
Figure 1 is a side view of a compression spring embodying the present invention.

In the form of the invention shown in Figure 1 of the drawings, in which is shown a compression spring having a plurality of zones of different pitch in a single coil, an abrupt break in the load-deflection characteristic occurs approximately centered with respect to its oscillations during normal use, whereby such oscillations are prevented from becoming resonant. The illustrated spring comprises a continuous wire coil having the usual flat turns 2 at its ends and, between its ends, turns of different pitch respectively arranged in groups or zones each of uniform pitch, the spring herein shown comprising a middle group or zone 6 made up of turns having the smallest pitch of the several groups. Upon either side of the middle zone or group 6 are zones 8 of uniform pitch greater than the middle zone 6, the zones 8 each comprising a plurality of turns. Outside the intermediate zones 8 are the end zones 12 of uniform pitch of greater pitch than the pitch in the intermediate zones 8.

From the foregoing description it will be seen that, if the continuous coil compression spring shown in Figure 1 is compressed by gradually increased pressure applied to the ends 2, the turns in zone 6 will be pressed against each other while the turns of the zones 8 and 12 are still spaced from each other. When the turns of zone 6 are thus brought into contact with each other this zone ceases abruptly to be a compressible part of the spring and therefore the load-deflection characteristic of the spring as a whole changes abruptly when this part of the spring is deflected from a condition with separated turns to a condition in which its turns contact or vice versa. This change is shown at A by the lower angle or "knee" in the load-deflection graph in Figure 4 of the drawings.

Figure 4:
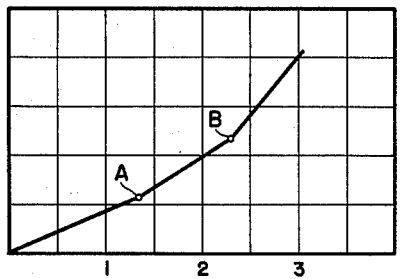
Figure 4 is a graph showing the characteristic load-deflection curve of the spring shown in Figure 1.
Figure 5:
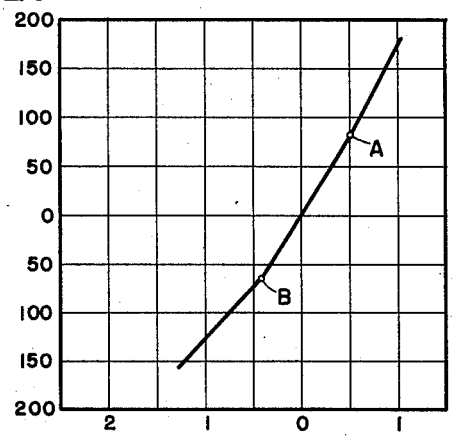
Figure 5 is a graph showing the characteristic load-deflection curve of the combined springs shown in Figure 2.

While the turns of zone 6 have been separated the load-deflection curve shown in Figure 4 has been substantially a straight line of uniform slope and the narrowing of the spacing between the turns in any one of the groups 6, 8 and 12 has been substantially uniform so that the spacing between the successive turns in each zone at any given time has been the same. When, however, the turns of the zone 8 contact each other, the entire compression from then on must be taken up by the zone 12; the load-deflection rate is, therefore, changed again, as indicated at B in Figure 4, and, although it continues as a straight line, its slope is again increased.

When the spring is relaxed an opposite change occurs at each of the knees A and B; i. e., the slope is abruptly reduced as the additional zone or zones comes into action.

The spring just described may be used, for example, in a conventional compression spring pipe hanger, to support a steam or hot oil line, etc., from a fixed frame or anchorage in a conventional hanger designed for compression spring. In such case the spring may be designed to just balance the weight of the load, with the piping cold, when the turns of zones 6 are pressed together and the turns of zones 8 are just touching. Thus with any oscillations which could tend to become harmonic the turns of zones 8 alternately come into and go out of action, with the consequent change of the resonance characteristic of the spring. In the position of the load assumed after the piping is heated to operating temperature, the turns of zones 8 are extended and the turns of zone 6 are just touching. Thus in the hot position any oscillations which tend to become harmonic move past the position at which these turns of zone 6 go out of action, and thus, again, resonance is prevented by the abrupt change in the load-deflection characteristic.

Figure 2:
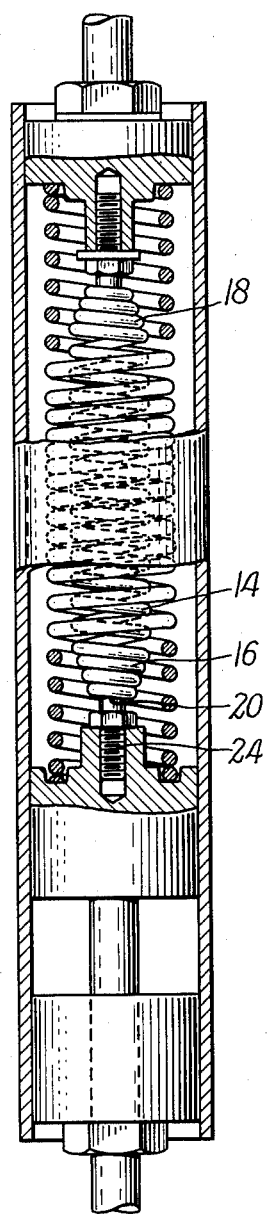
Figure 2 is a side view of a spring unit including a compression spring such as that shown in Figure 1 pre-loaded by a tension spring.

In the form of the invention shown in Figure 2, a compression spring of the type just described is combined with a tension spring 14, which preloads the compression spring. The spring 14 shown in Figure 2 comprises a continuous coil, preferably having its ends 16 and 18 tightly wound into conical shape to receive conical plugs 20, from which extend bolts or other suitable connecting means 24 for connecting the spring ends to any suitable parts which produce a tensile stress by their relative movements. Between its conical plug-receiving ends 16 and 18, this spring is shown made up of turns of uniform pitch, but this is not necessary to the application of my invention.

The addition of the pre-loading tension spring, changes the slope of the load-deflection graph in each part, but does not affect the abrupt changes of slope or "knees" in the graph. With such a combination, depending upon the relative stiffness of the two springs, the combination can act either as a compression unit or as a tension unit or both; and although I have shown the compression spring with different zones and the tension spring uniform between its tight end coils, the "knees" may be in either spring or both, since a knee in the characteristic of either spring will appear likewise in the characteristic of the combination.

Figure 3:
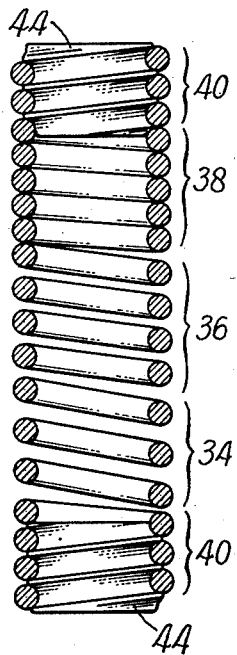
Figure 3 is a side view of a spring designed to be used either as a compression spring or as a tension spring and to have the non-uniform load-deflection and non-harmonic characteristics of the present invention when used in either way.

Figure 3 shows the invention embodied in a spring which may be used either as a compression spring or as a tension spring and which will have the non-uniform load-deflection and non-harmonic characteristics of the spring of the present invention in either manner of its use. The spring shown in Figure 3 has three operative zones 34, 36 and 38 and, at its ends, groups of turns 40, each consisting of three closely wound turns, to receive screwed-in end plugs 44 by means of which the spring can be connected to any suitable relatively movable parts for use either as a compression spring or as a tension spring. The group or zone 34 of the spring shown in Figure 3 is made up of three turns of uniform pitch, these turns having the greatest spacing of any zone. For example, they may be spaced ¼" apart. The group or zone 36 is shown as comprising four turns of uniform pitch the spacing of the turns of this group being shown as one-half the spacing of the turns or groups 34, say ⅛". The five turns of the group or zone 38 are shown as contacting each other and, of these, three turns are just touching and the balance are uniformly backwound so that these turns are held against each other under internal stress so predetermined that this stress may be overcome and these turns separated well within the operating range of elastic tensive deflection of the spring.

Figure 6:
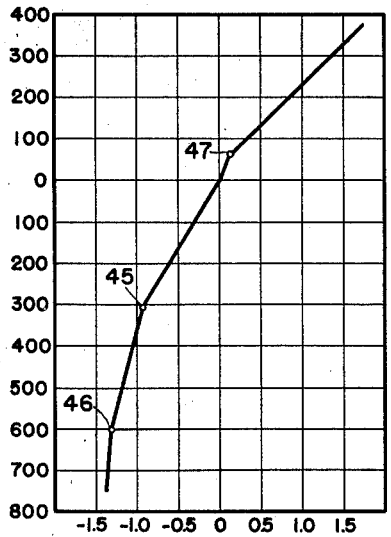
Figure 6 is a graph showing the characteristic load-deflection curve of the spring shown in Figure 3, both when it is used as a compression spring and when it is used as a tension spring.

It will be seen that the spring thus described can be operated either as a compression spring having the non-uniform load-deflection characteristics of the present invention or as a tension spring having the same characteristics. When operated as a compression spring, as shown by the graph in Figure 6, in that part of the graph below the axis of abscissas, the load-deflection rate will be substantially uniform, that is, the slope of the curve will be substantially constant, until the turns of the zone or group 36 have been brought into contact with each other and thus cease to function as a compressible part of the spring, when the rate will change, as shown in Figure 6 at 45. The only compressible part of the spring remaining will then be the turns of zone or group 34, and below the first "knee" 45 the slope is the load-deflection characteristic of this section of the spring. The second "knee" 46 occurs when this last section of the spring goes out of action, and the steep slope beyond this represents merely the distortion in cross-section of the wire.

When the spring is put in tension, first a "knee" appears at the origin or zero point. Another "knee" 47 appears, finally when the backwind zone 38 begins to separate.

From the foregoing description it will be seen that the spring of the present invention has a wide field of utility and that, by reason of its division into zones of the character of those hereinabove described, the spring particularly lends itself to the achievement, by the designer of simple and economical designs of non-harmonic supports for vibrating parts or the like.

This application is a continuation-in-part of my co-pending application Serial No. 390,415, filed April 25, 1941, now abandoned.

What is claimed as new is:

1. A coiled wire tension spring having a non-uniform load-deflection characteristic in its operating range which comprises a plurality of zones each composed of adjacent helical turns of wire and the spacing of the turns being different in different zones, the permissible oscillatory range of elastic deflection of the spring between its elastic limits of stress at which permanent deformation begins extending a substantial distance on each side of the point at which the turns in one zone come into contact while those in another zone are substantially spaced, said spring having the turns of one zone pressed together by backwind to an extent that, while the turns of another zone are stretched to substantially increased spacing, its turns are still held together by pressure between them and the elastic limit of the other zone, in which the turns are spaced, is substantially beyond the point at which the tension of said other zone separates the turns of the first-named zone.

2. A spring device having non-uniform load-deflection characteristics upon variation in compressive load comprising, a coil spring having at least two zones each of different pitch and spring means preloading said spring to a point where the coils of at least one zone thereof are in mutual compressive contact, whereby, upon reduction in compression from a static load condition, the initial load-deflection ratio will be maintained only until the coils of the zone of mutual contact are extended whereupon the effective length of spring will be increased resulting in a change in the overall load-deflection ratio.

3. A spring device having non-uniform load-deflection characteristics upon increase or decrease in compressive load comprising, a coil spring having at least three zones each of different pitch, and a secondary spring preloading said coil spring to a point where the coils of at least one of said zones are in mutual contact, whereby, upon variations from a static load condition, the initial load-deflection ratio will be maintained only to the point at which the coils of a zone are either extended from mutual contact or collapsed to mutual contact whereupon the effective length of the spring will be varied to cause a change in its overall load-deflection ratio thus rendering the device as a whole nonharmonic.

JOSEPH KAYE WOOD.

References Cited in the file of this patent

UNITED STATES PATENTS

| Number | Name | Date |
|---|---|---|
| 190,061 | Middleton | Apr. 24, 1877 |
| 210,027 | Hansell | Nov. 19, 1878 |
| 1,083,501 | Lewis | Jan. 6, 1914 |
| 1,101,195 | Kronenberg | June 23, 1914 |
| 1,386,855 | Ewing | Aug. 9, 1921 |
| 2,116,012 | Busha | May 3, 1938 |
| 2,222,146 | Jonsson | Nov. 19, 1940 |
| 2,267,153 | Holland | Dec. 23, 1941 |
| 2,356,940 | Marison | Aug. 29, 1944 |

FOREIGN PATENTS

| Number | Country | Date |
|---|---|---|
| 348,667 | Great Britain | May 11, 1931 |

OTHER REFERENCES

The catalog on "Springs" by the Wallace Barnes Co. of Bristol, Conn., copyrighted in 1936 as Booklet No. 10, page 22 and page 47.